"""""""""""""""""""""""""""""""" US009198227B2

(12) United States Patent  (10) Patent No.: US 9,198,227 B2
Li et al.  (45) Date of Patent: Nov. 24, 2015

(54) WIRELESS COMMUNICATION FUNCTION-EQUIPPED ELECTRONIC DEVICE

(71) Applicant: ALPS ELECTRIC CO., LTD., Tokyo (JP)

(72) Inventors: Xi Li, Tokyo (JP); Tomotaka Suzuki, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 367 days.

(21) Appl. No.: 13/719,074

(22) Filed: Dec. 18, 2012

(65) Prior Publication Data

US 2013/0100946 A1  Apr. 25, 2013

Related U.S. Application Data

(63) Continuation of application No. PCT/JP2011/066345, filed on Jul. 19, 2011.

(30) Foreign Application Priority Data

Jul. 21, 2010 (JP) ................................ 2010-164025

(51) Int. Cl.
*H04W 88/02* (2009.01)
*H01Q 1/32* (2006.01)
*H01Q 1/44* (2006.01)
*H01Q 23/00* (2006.01)

(52) U.S. Cl.
CPC ................ *H04W 88/02* (2013.01); *H01Q 1/32* (2013.01); *H01Q 1/3216* (2013.01); *H01Q 1/44* (2013.01); *H01Q 23/00* (2013.01)

(58) Field of Classification Search
CPC .................................................... H04W 88/02

USPC .......................................................... 343/711
See application file for complete search history.

(56) References Cited

U.S. PATENT DOCUMENTS

2008/0100522 A1   5/2008  Inaba et al.
2009/0115673 A1*  5/2009  Nysen ........................... 343/730
2010/0188306 A1   7/2010  Kitayoshi et al.

FOREIGN PATENT DOCUMENTS

JP  2002-321575  11/2002
JP  2002-353713  12/2002
JP  2003-60415    2/2003

OTHER PUBLICATIONS

Search Report dated Oct. 25, 2011 from International Application No. PCT/JP2011/066345.

*Primary Examiner* — Dameon E Levi
*Assistant Examiner* — Andrea Lindgren Baltzell
(74) *Attorney, Agent, or Firm* — Beyer Law Group LLP

(57) ABSTRACT

In an electronic device in which an electronic component (e.g., an encoder) including an operation body is mounted on a circuit board and a process corresponding to an input operation of the operation body is performed by a control section, a wireless communication processing section and a matching circuit which are provided on the circuit board are connected to each other via a transmission line, and in order to cause a mounting member (a mounting plate and an outer casing) of the electronic component, which is made of metal and is ungrounded, to operate as an antenna, a predetermined position (a leg piece) in the mounting plate and the matching circuit are connected to each other via a transmission line to cause the predetermined position to serve as a power supply section. Thus, a wireless communication function-equipped electronic device for which a dedicated antenna is unnecessary is obtained.

12 Claims, 3 Drawing Sheets ized as the mounting member, it is possible to further increase the sensitivity of wireless communication.

WIRELESS COMMUNICATION FUNCTION-EQUIPPED ELECTRONIC DEVICE

CLAIM OF PRIORITY

This application is a Continuation of International Application No. PCT/JP2011/066345 filed on Jul. 19, 2011, which claims benefit of Japanese Patent Application No. 2010-164025 filed on Jul. 21, 2010. The entire contents of each application noted above are hereby incorporated by reference.

BACKGROUND OF THE INVENTION

1. Field of the Invention

The present invention relates to an electronic device capable of performing an input operation by an operation member and capable of performing wireless communication, and in particular, relates to a wireless communication function-equipped electronic device suitable as an in-vehicle device.

2. Description of the Related Art

In recent years, an in-vehicle electronic device such as a car navigation system has been put into practical use as a wireless communication function-equipped electronic device which is provided with an antenna and a transmitting/receiving circuit (wireless communication processing section), thereby, for example, establishing an in-vehicle wireless LAN with a mobile phone or the like held by a driver to enable wireless communication to be performed with an external base station or the like.

In the related art, for such a type of electronic device, a technology has been proposed in which in order to enable wireless communication to be performed with favorable sensitivity with a mobile phone or the like in a driver's seat or in its vicinity, an antenna is incorporated into an operation button for a hazard switch which is arranged in front of the driver's seat (e.g., see Japanese Unexamined Patent Application Publication No. 2002-187489).

In addition, as another related art example of such a type of electronic device, a technology has been proposed in which: an antenna is arranged in an end portion of a circuit board within an electronic device arranged in an instrument panel, such that the antenna faces a media-insertion opening of the electronic device, thereby enabling wireless communication to be performed with favorable sensitivity with a mobile phone or the like in a driver's seat or in its vicinity; and it is unnecessary to connect a power supply section of the antenna to a transmitting/receiving circuit provided on the circuit board by using a cable (e.g., see Japanese Unexamined Patent Application Publication No. 2006-272998).

However, in the related art disclosed in Japanese Unexamined Patent Application Publication No. 2002-187489, an operation of incorporating an antenna into an operation button for a hazard switch and an operation of drawing a cable from a power supply section of the antenna to a transmitting/receiving circuit are cumbersome, and thus the assembly cost is increased. In addition, in the related art disclosed in Japanese Unexamined Patent Application Publication No. 2006-272998, although it is unnecessary to connect the power supply section of the antenna to the transmitting/receiving circuit by using a cable, the antenna has to be mounted on the circuit board of the electronic device while taking into account the positional relation with the media-insertion opening, and thus the assembly cost is inevitably increased.

SUMMARY OF THE INVENTION

The present invention has been made in view of such a circumstance of the related art and provides a wireless communication function-equipped electronic device for which an operation of mounting an antenna and an operation of drawing a cable from a power supply section of the antenna are unnecessary and thus an assembly cost can be significantly reduced.

The present invention provides a wireless communication function-equipped electronic device including: an electronic component including at least an operation member, an external connection terminal, and a conductive mounting member; a circuit board on which the electronic component is mounted; a control section configured to perform a process corresponding to an input operation of the operation member; a wireless communication processing section configured to perform a process of a wireless signal; and a matching circuit provided so as to be connected to the wireless communication processing section in a high-frequency manner. The mounting member is fixed to the circuit board in an electrically open state, and the matching circuit is connected to a predetermined position in the mounting member in a high-frequency manner to cause the mounting member to operate as an antenna in which the predetermined position serves as a power supply section.

In many cases, a conductive metal material is used for the mounting member (e.g., a mounting plate or an outer casing) of the electronic component including the operation member, and the mounting member is present adjacent to the operation member protruding to the outside. Thus, it is possible to cause the mounting member to operate as an antenna which resonates in a specific frequency band, by supplying power to the predetermined position in the mounting member which is made of metal and is ungrounded. At that time, since the matching circuit is inserted between the power supply section of the mounting member and the wireless communication processing section such as a transmitting/receiving circuit to provide impedance matching, even when the mounting member of the electronic component is not produced as an antenna, the mounting member can be caused to operate as an antenna which can be practically used, and a dedicated antenna is unnecessary for the wireless communication function-equipped electronic device. Therefore, an operation of mounting an antenna and an operation of drawing a cable from a power supply section of the antenna are unnecessary, and the assembly cost can be significantly reduced.

In the above configuration, if the electronic component includes a mounting plate having a leg piece fixed to the circuit board and the mounting plate is made of a metal plate and is included in the mounting member, power is easily supplied to the mounting member by connecting the leg piece of the mounting plate to a transmission line provided on the circuit board. Thus, it is unnecessary to additionally perform a connection for power supply when mounting the encoder, and the assembly cost can be reduced further. In this case, if the electronic component includes an outer casing fixed to the circuit board in a state of supporting the operation member and being retained by the mounting plate and the outer casing is made of metal and is included in the mounting member, it is easy to increase the sensitivity of wireless communication. Furthermore, if in addition to the outer casing, the operation member made of a conductive metal material is also configured to operate as a part of the antenna, it is easy to further increase the sensitivity of wireless communication.

In addition, in the above configuration, it is preferred if the wireless communication function-equipped electronic device is an in-vehicle electronic component in which the operation member is arranged at such a position that the operation member can be operated by a user in a vehicle, since an in-vehicle wireless LAN can be established with a mobile phone or the like held by a driver.

DESCRIPTION OF THE PREFERRED EMBODIMENTS

Figure 1:
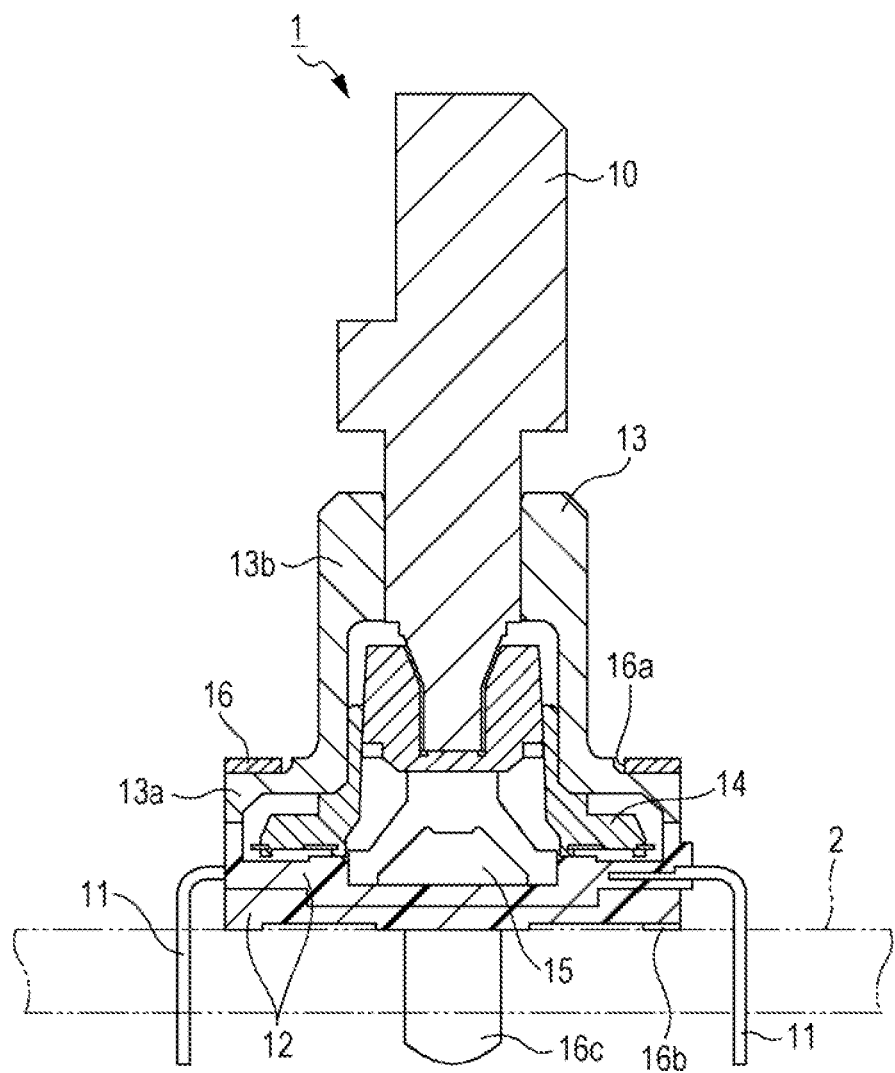
FIG. 1 is a cross-sectional view of an encoder which also serves as an antenna and is used in an electronic device according to an embodiment of the present invention.
Figure 2:
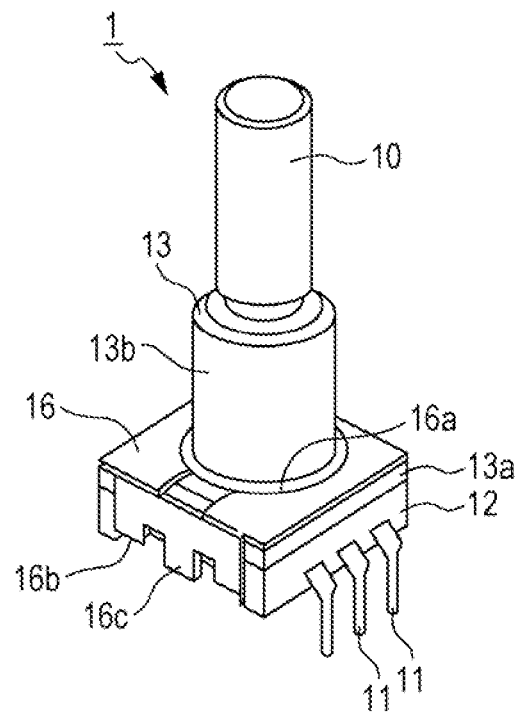
FIG. 2 is an external view of the encoder.

Hereinafter, a wireless communication function-equipped electronic device according to an embodiment of the present invention will be described with reference to FIGS. 1 to 5. The electronic device according to this embodiment is an in-vehicle electronic device, such as a car navigation system, in which various operation members are arranged at such positions that the operation members can be operated by a user in a vehicle. One of a plurality of the operation members is an operation body 10 of an encoder 1 shown in FIGS. 1 and 2. The encoder 1 is mounted on a circuit board 2, and a plurality of external connection terminals 11 of the encoder 1 are electrically connected to a control section 4 via corresponding wiring patterns 3 on the circuit board 2 side. The control section 4 is provided on the circuit board 2. When the user manually operates the operation body 10 of the encoder 1, a process corresponding to the input operation is performed by the control section 4. In addition, in order to enable wireless communication to be performed for an in-vehicle wireless LAN, a wireless communication processing section 5 that is a transmitting/receiving circuit and a matching circuit 6 (see FIG. 4) that is an LC circuit are provided on the circuit board 2. The wireless communication processing section 5 and the matching circuit 6 are connected to each other via a transmission line 7 in a high-frequency manner.

The encoder 1 includes a base 12 which is made of a synthetic resin and retains a plurality of the external connection terminals 11 by insert molding, and an outer casing 13 which is mounted and fixed on the base 12. The outer casing 13 supports the operation body 10 such that a rotation operation and a push operation of the operation body 10 are possible. In addition, as shown in FIG. 1, in the encoder 1, a first detection section 14 which detects a change in the rotational position of the operation body 10 and a second detection section 15 which detects that a push operation of the operation body 10 is performed are provided in an inner space which is located on the base 12 and surrounded by the outer casing 13. The external connection terminals 11 extend from these first and second detection sections 14 and 15, respectively.

Figure 3:
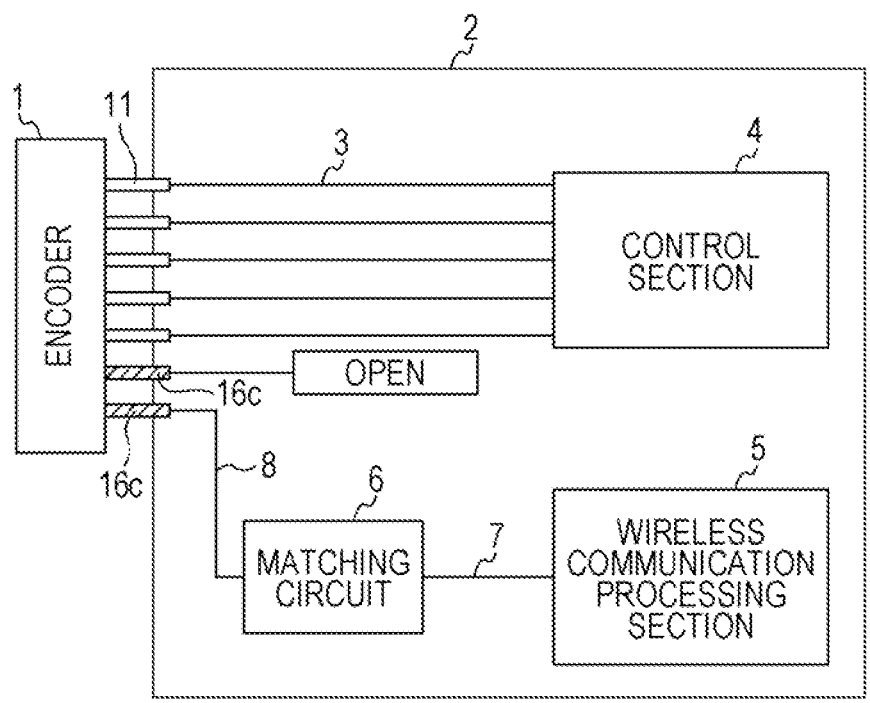
FIG. 3 is a block diagram for illustrating a connection relationship between a body side of the electronic device and the encoder.

The operation body 10 is a columnar body made of aluminum or the like. The outer casing 13 is made of a zinc die casting, and has an appearance in which a cylindrical portion 13b is arranged upright on a flange portion 13a. One end portion of the outer casing 13 (an end of the cylindrical portion 13b) is adjacent to the operation body 10, and the other end portion of the outer casing 13 (the flange portion 13a) is retained together with the base 12 by a mounting plate 16 made of a metal plate. The mounting plate 16 is provided with a relief hole 16a through which the cylindrical portion 13b of the outer casing 13 extends, a plurality of mounting pieces 16b which are caulked and fixed to the base 12, and a pair of leg pieces 16c which are fixed to the circuit board 2. In other words, the outer casing 13 and the mounting plate 16 are fixed to the circuit board 2 as integrally laminated mounting members while retaining the operation body 10 and the base 12. As shown in FIG. 3, one of the leg pieces 16c is connected to the matching circuit 6 via a transmission line 8 in a high-frequency manner, whereby a power supply signal is supplied from the wireless communication processing section 5 to this leg piece 16c. It is noted that the other leg piece 16c is in an electrically open state, and the mounting plate 16, the outer casing 13, and the operation body 10, which are made of a conductive metal material, are ungrounded.

Figure 4:
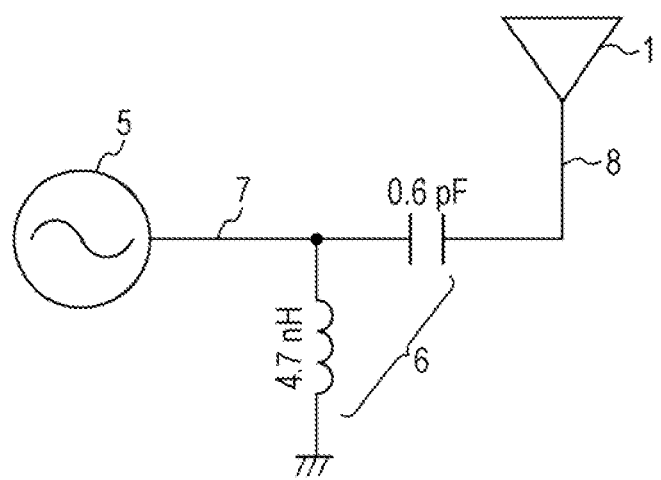
FIG. 4 is an equivalent circuit diagram showing an example of a matching circuit inserted between the encoder and a wireless communication processing section.
Figure 5:
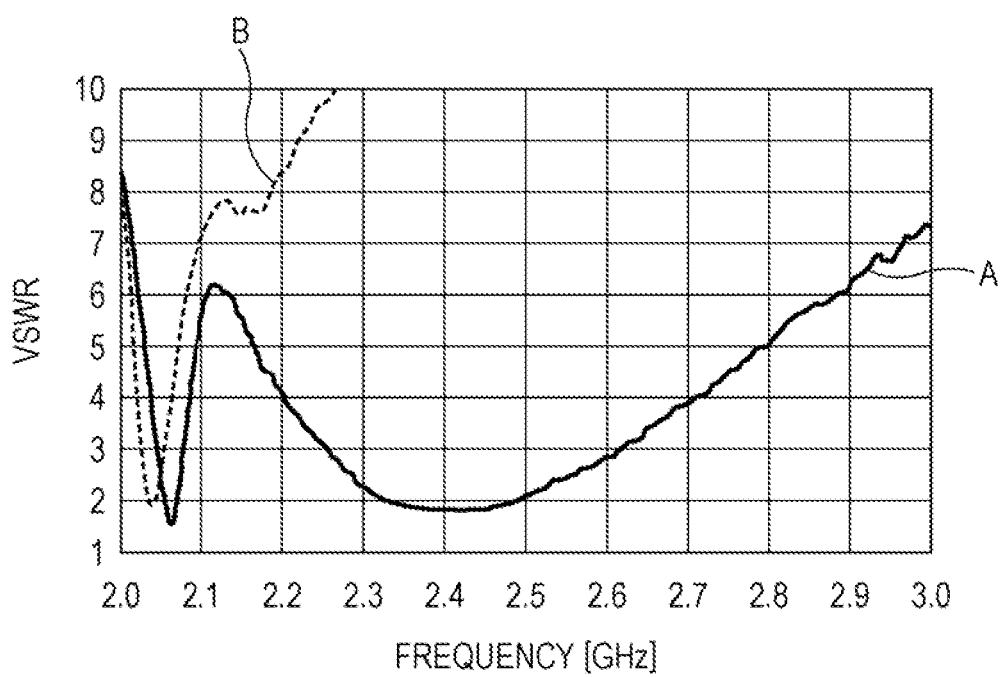
FIG. 5 is a characteristic diagram showing a correlation between a frequency and a voltage standing wave ratio of an antenna section of the encoder.

In the electronic device configured as described above, the certain leg piece 16c of the encoder 1 serves as a power supply section. Thus, the mounting plate 16 and the outer casing 13, which are mounting members made of metal, and the operation body 10 made of metal cooperate to operate as an antenna section which resonates in a predetermined frequency band. In the case of this embodiment, the voltage standing wave ratio (VSWR) of the antenna section of the encoder 1 changes according to frequency as shown by a solid-line curve A in FIG. 5. Thus, the antenna section can be caused to resonate in the 2.4 GHz band suitable for short-range wireless communication such as Bluetooth (registered trademark). It is noted that in this embodiment, the matching circuit 6 shown in FIG. 4 is used, but when power is supplied to the antenna section of the encoder 1 without passing through the matching circuit 6, a characteristic shown by a dotted-line curve B in FIG. 5 is obtained and a desired antenna characteristic is not obtained.

As described above, in the wireless communication function-equipped electronic device according to this embodiment, the mounting plate 16 and the outer casing 13, which are mounting members of the encoder 1 and are made of metal, and the operation body 10, which protrudes to the outside and is made of metal, cooperate to operate as the antenna section which resonates in the desired frequency band. Thus, it is unnecessary to provide a dedicated antenna. In other words, not only in this embodiment, in many cases, a metal material is used for a mounting member and an operation member of an electronic component such as an encoder. Thus, it is possible to cause these mounting member and operation member to operate as a single antenna by supplying power to a predetermined position via a matching circuit. In the case of this embodiment, it can be confirmed that the antenna section (the mounting plate 16, the outer casing 13, and the operation body 10) of the encoder 1 resonates in a desired frequency band (the 2.4 GHz band) as shown in FIG. 5 when power is supplied to a predetermined position in the mounting plate 16 via the matching circuit 6. As a result, it is unnecessary to perform an operation of mounting an antenna and an operation of drawing a cable from a power supply section of the antenna. Thus, the assembly cost of the wireless communication function-equipped electronic device can be significantly reduced.

In addition, in this embodiment, the leg piece 16c formed in the mounting plate 16 of the encoder 1 serves as the power supply section. Thus, when the mounting plate 16 is mounted on the circuit board 2, power supply is made possible if the leg piece 16c is connected to the transmission line 8. Thus, it is unnecessary to additionally perform a connection for power supply when mounting the encoder 1, and the assembly cost can be reduced further.

Furthermore, in this embodiment, in addition to the mounting plate 16 of the encoder 1, the operation body 10 protruding to the outside and the outer casing 13 adjacent to the operation body 10 operate as a part of the antenna. Thus, it is easy to increase the sensitivity of wireless communication.

It is noted that when the size, the shape, or the like of the antenna section of the encoder 1 are different from those in the above embodiment, for example, when the operation body 10 is made of a non-metal material and does not contribute to an antenna operation, it is only necessary to appropriately change the values of the L component and the C component of the matching circuit 6. In addition, if the LC circuit which is the matching circuit is appropriately changed, the present invention is also applicable to the case where a mounting member or an operation member of an electronic component (e.g., a push switch or a variable resistor) other than an encoder and the case where the used frequency band is not the 2.4 GHz band. Thus, although the present invention is applicable to an electronic device other than an in-vehicle electronic device, if the operation member (operation body) is arranged at such a position that the operation member can be operated by the user in the vehicle as in the above embodiment, an in-vehicle wireless LAN can be established with a mobile phone or the like held by the driver, and thus the practical value of the present invention is increased.

What is claimed is:

1. An electronic device with a wireless communication function, the electronic device comprising:
    a circuit board;
    an encoder mounted on the circuit board, the encoder including:
        at least one operation member operated by a user to perform an input operation;
        an external connection terminal; and
        a conductive mounting member fixed to the circuit board in an electrically open state, the conductive mountain member includes:
            an outer casing made of a metal and holding the operation member; and
            a mounting plate made of a metal and having a leg piece fixed to the circuit board, the mounting plate supporting the outer casing and fixing the outer casing to the circuit board;
    a control section configured to perform a process corresponding to the input operation;
    a wireless communication processing section configured to process a wireless signal; and
    a matching circuit connected to the wireless communication processing section,
    wherein the operation member is made of a conductive material, and the leg piece is connected to the matching circuit via a high-frequency coupling, whereby the conductive mounting member and the operation member cooperatively operate as an antenna for the wireless communication by supplying power to the leg piece through the matching circuit.

2. The electronic device according to claim 1, wherein the electronic device is an in-vehicle encoder in which the operation member is arranged at such a position that the operation member can be operated by the user in a vehicle.

3. The electronic device according to claim 1, wherein the conductive mounting member further includes:
    another leg piece fixed to the circuit board and in an electrically open state.

4. The electronic device according to claim 1, wherein the at least one operation member and the conductive mounting member cooperatively form the antenna having a desired resonance frequency.

5. The electronic device according to claim 1, wherein the operation member has a columnar body.

6. The electronic device according to claim 1, wherein the outer casing holds the operation member such that the operation member provides at least one of a rotation operation and a push operation.

7. The electronic device according to claim 1, wherein the electronic device does not include a dedicated antenna for the wireless communication.

8. An electronic device with a wireless communication function, the electronic device comprising:
    a circuit board;
    an electronic component mounted on the circuit board, the electronic component including:
        an operation member configured to receive an input operation by a user, the operation body being made of a conductive material;
        an external connection terminal; and
        a conductive mounting member having leg pieces, the conductive mounting member holding the operation member and being fixed to the circuit board in an electrically open state via the leg pieces;
    a control section configured to perform a process corresponding to the input operation;
    a wireless communication processing section configured to process a wireless signal; and
    a matching circuit connected to the wireless communication processing section,
    wherein the leg pieces include a first leg piece which is in an electrically open state, and a second leg piece connected to the matching circuit via a high-frequency coupling, whereby the conductive mounting member and the operation member cooperatively operate as an antenna for the wireless communication by supplying power to the second leg piece through the matching circuit.

9. The electronic device according to claim 8, wherein the antenna formed of the operation member and the conductive mounting member has a predetermined resonance frequency.

10. The electronic device according to claim 8, wherein the operation member has a columnar body.

11. The electronic device according to claim 8, wherein the conductive mounting member holds the operation member so as to provide at least one of a rotational operation and a push operation.

12. The electronic device according to claim 8, wherein the electronic device does not include a dedicated antenna for the wireless communication.

* * * * *